Dec. 16, 1958
E. H. BRYANT, JR
2,864,895
RECORDING APPARATUS
Filed May 4, 1956
9 Sheets—Sheet 1
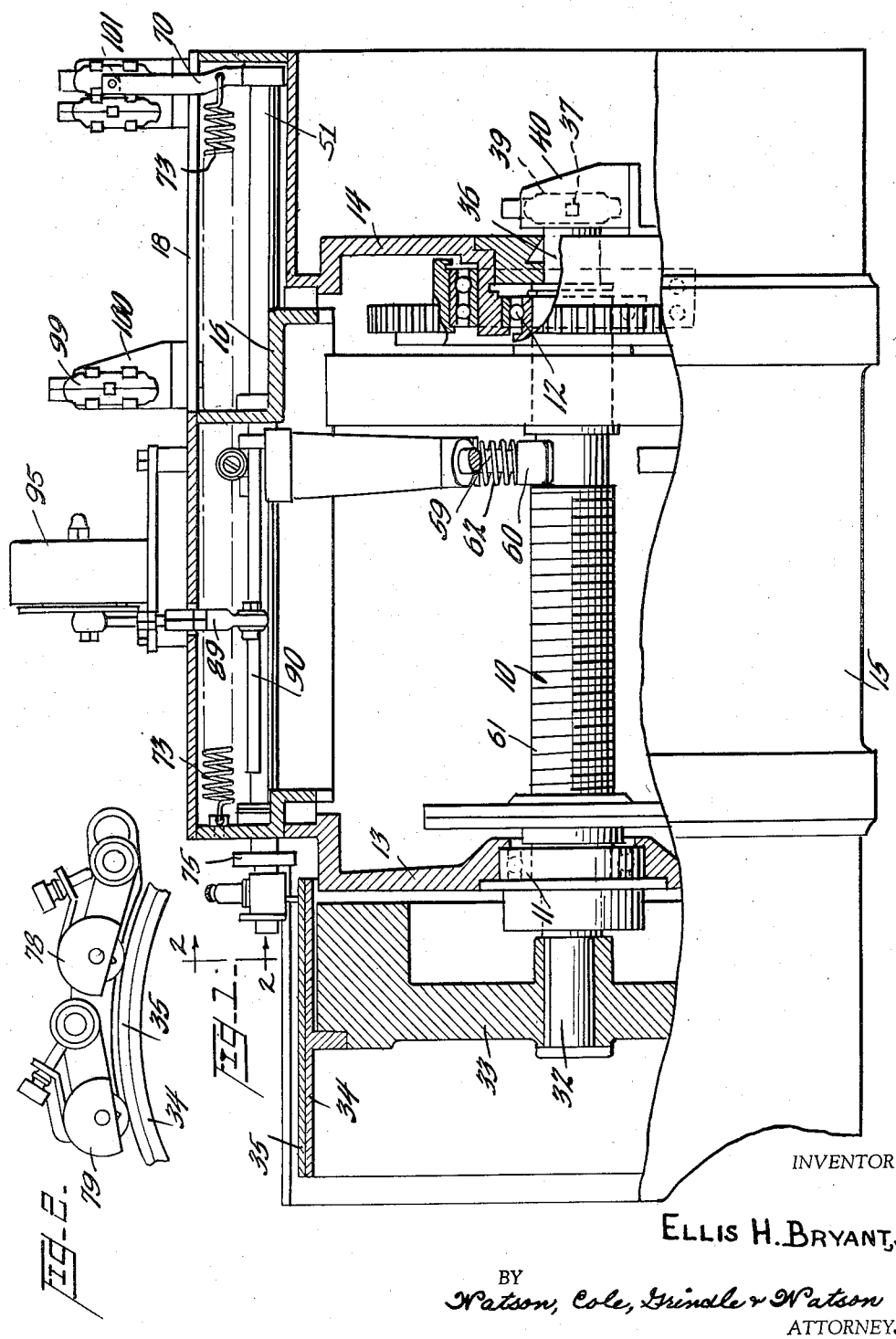
INVENTOR
ELLIS H. BRYANT, JR
BY
Watson, Cole, Grindle & Watson
ATTORNEYS

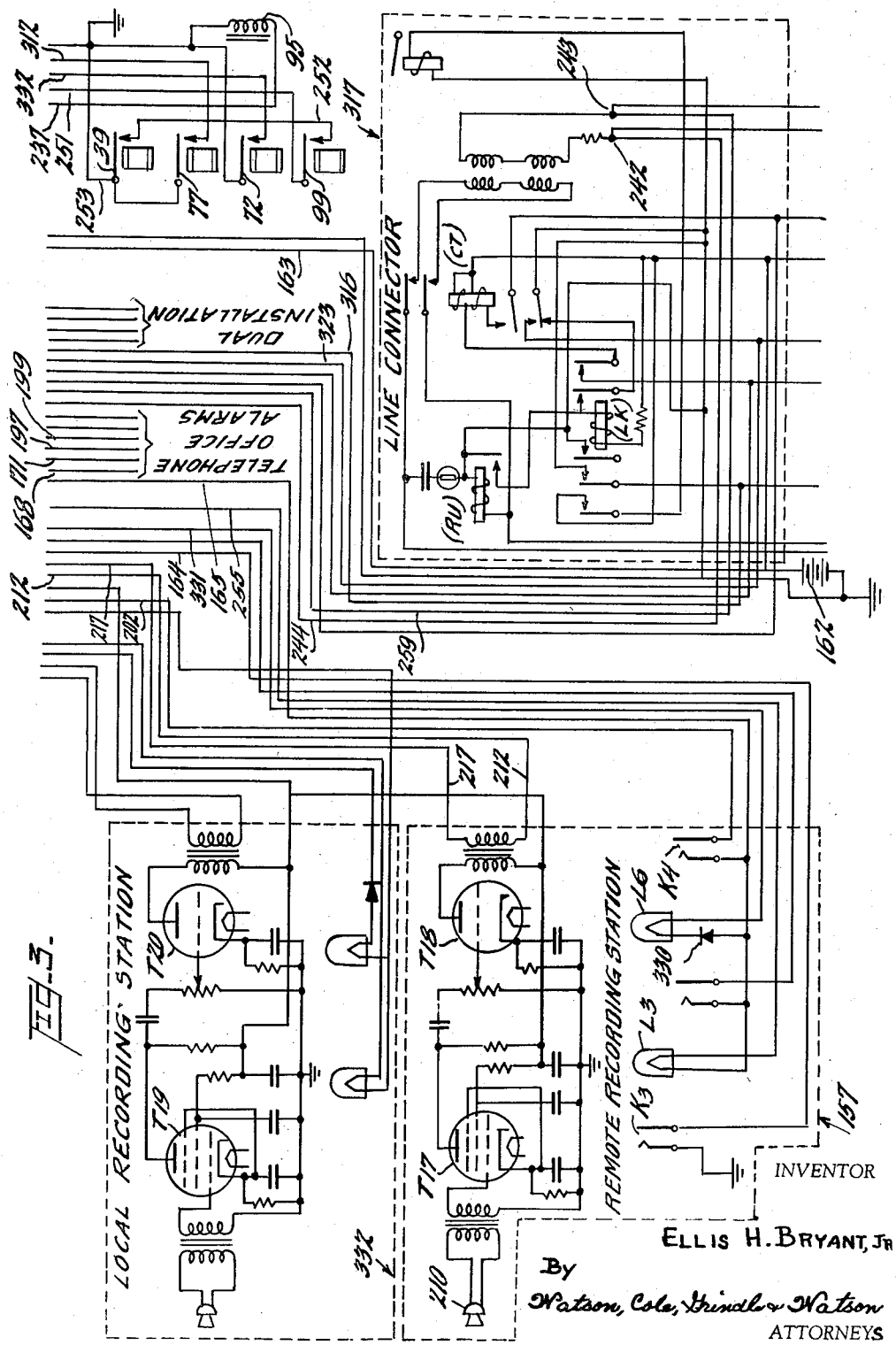

Dec. 16, 1958    E. H. BRYANT, JR    2,864,895
RECORDING APPARATUS
Filed May 4, 1956    9 Sheets-Sheet 3

INVENTOR
ELLIS H. BRYANT, JR
BY Watson, Cole, Grindle & Watson
ATTORNEYS

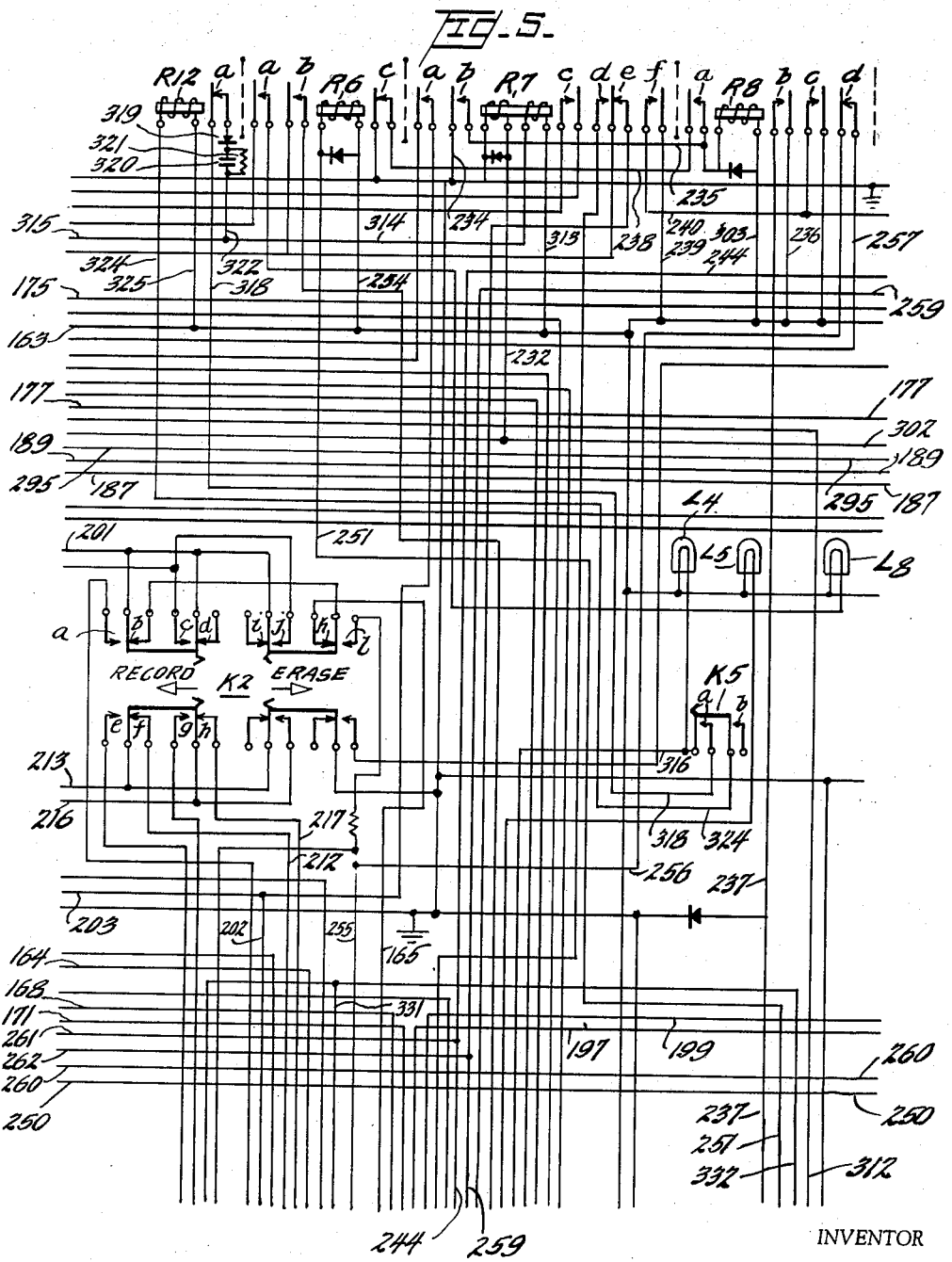

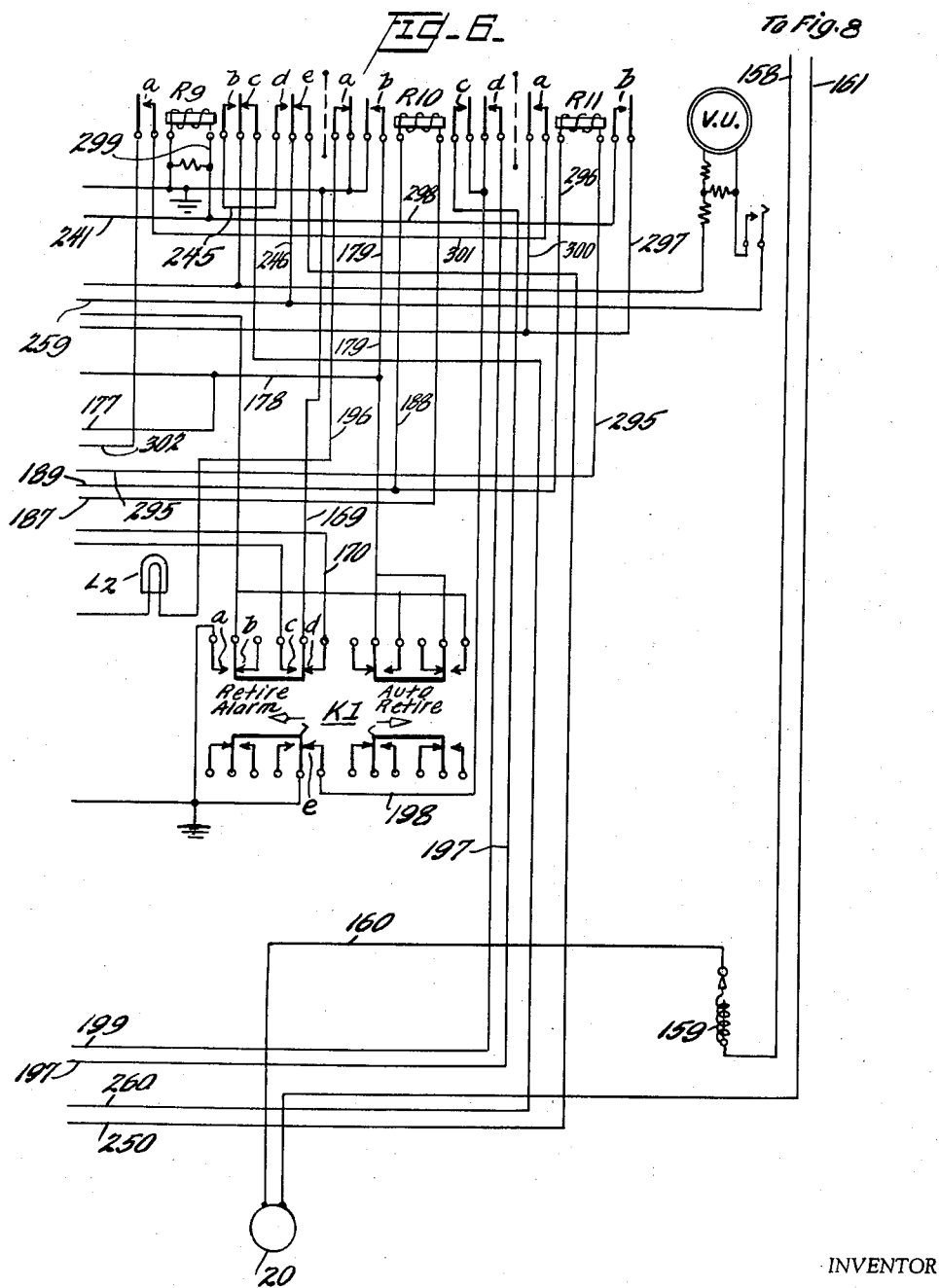

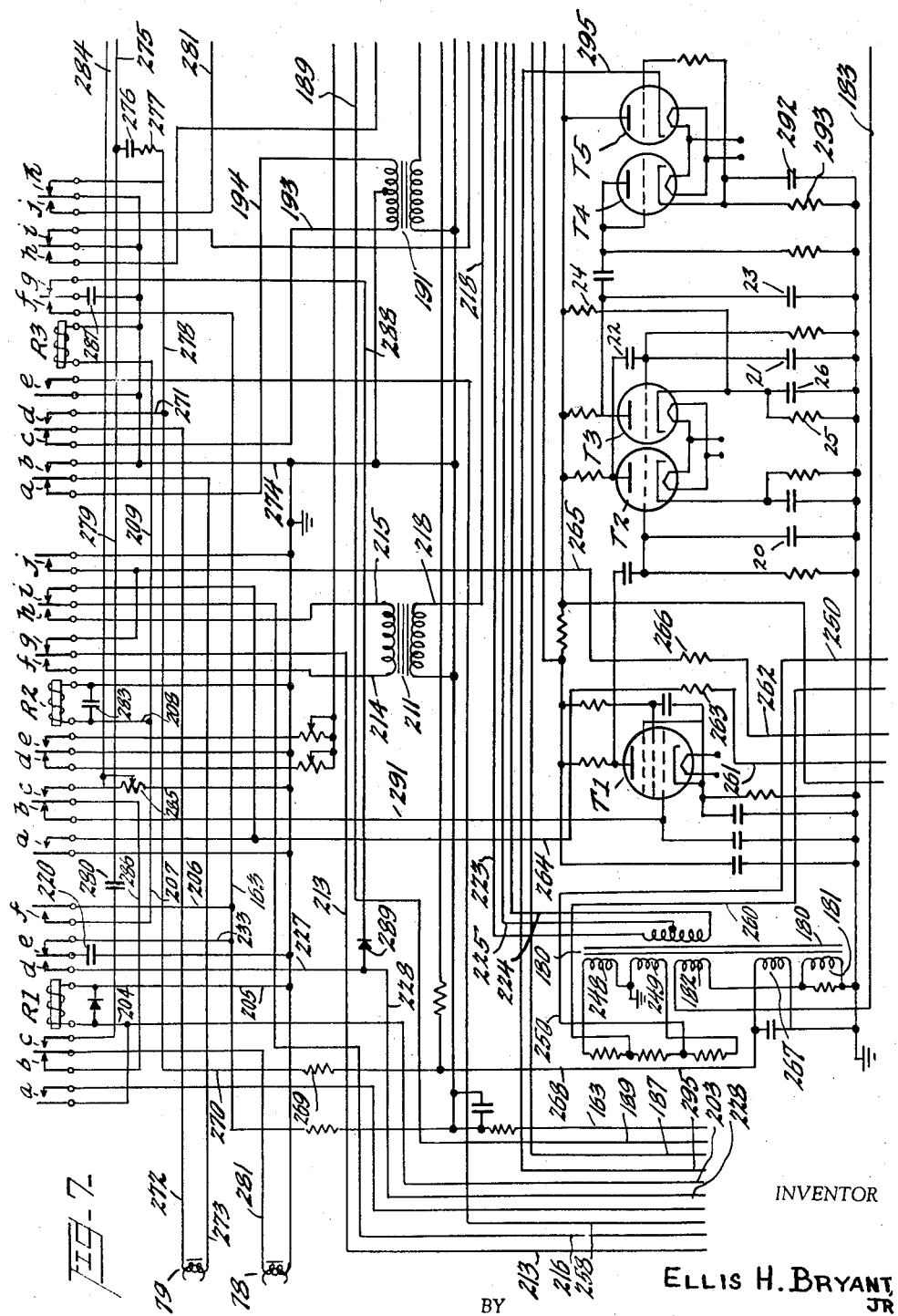

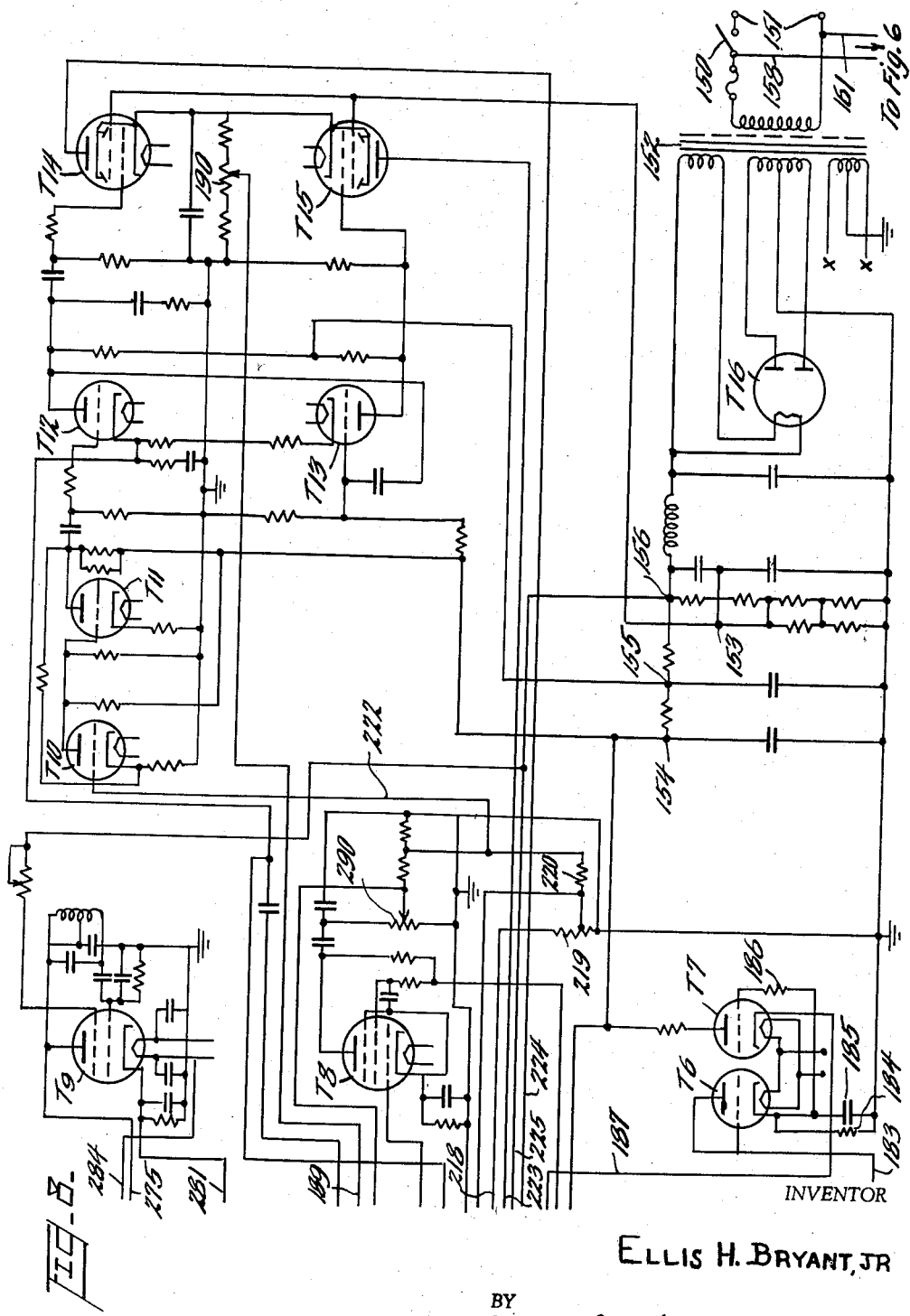

Dec. 16, 1958   E. H. BRYANT, JR   2,864,895
RECORDING APPARATUS
Filed May 4, 1956   9 Sheets-Sheet 8
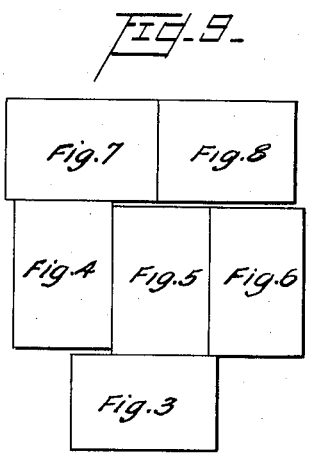
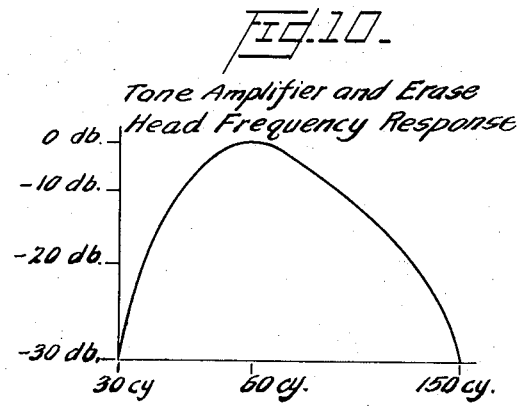
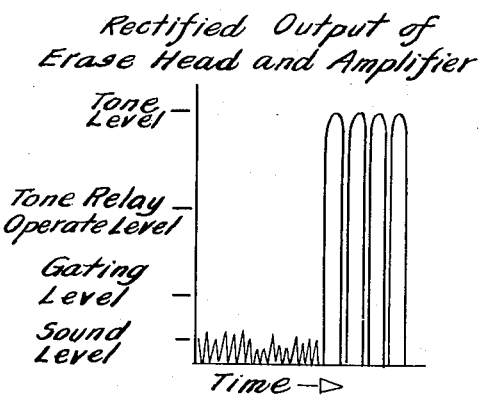
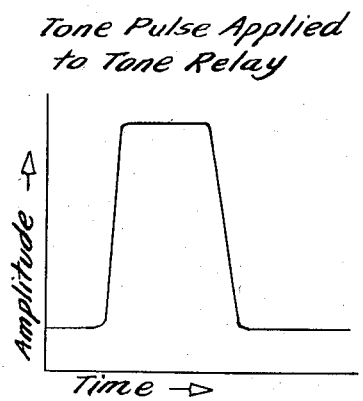
INVENTOR
ELLIS H. BRYANT, JR.
BY Watson, Cole, Grindle & Watson
ATTORNEYS

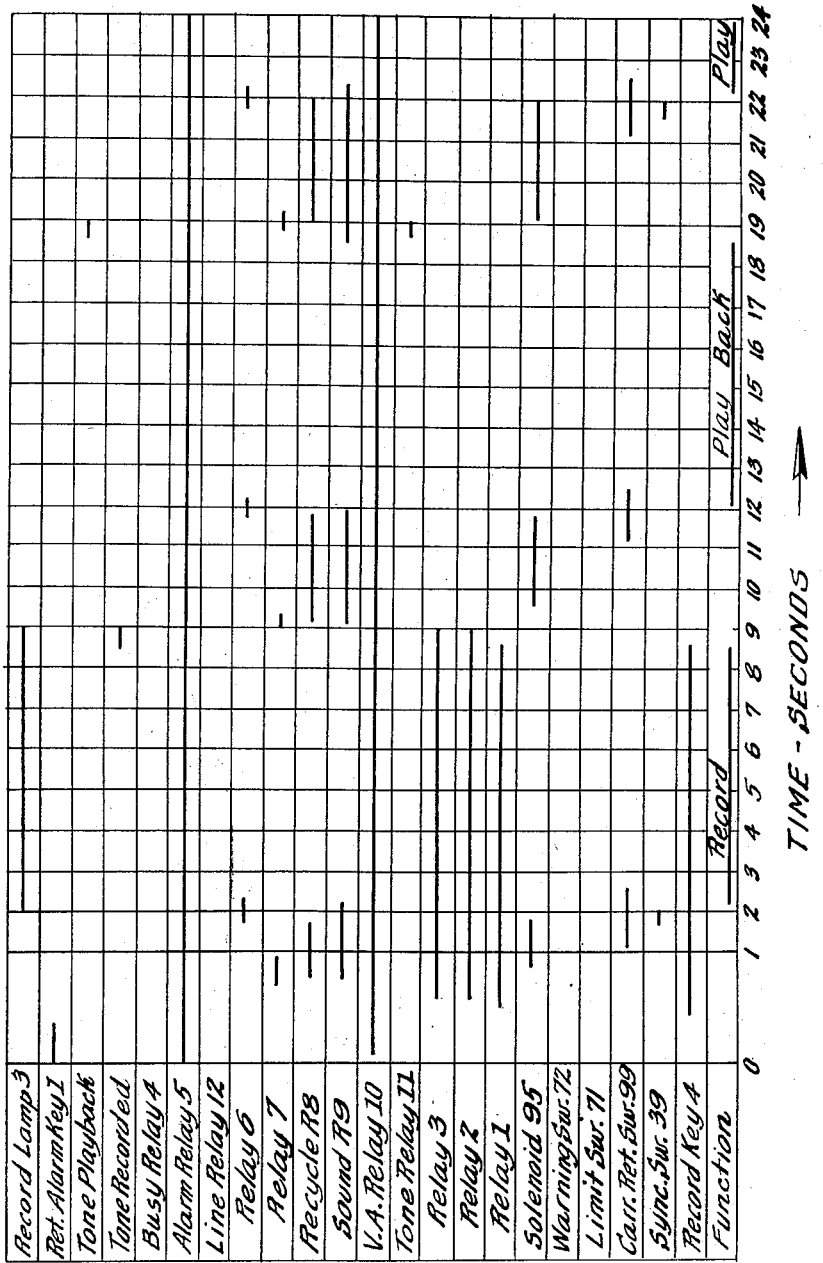

United States Patent Office 2,864,895
Patented Dec. 16, 1958

2,864,895

RECORDING APPARATUS

Ellis H. Bryant, Jr., Atlanta, Ga., assignor to John Leonard Franklin, Atlanta, Ga.

Application May 4, 1956, Serial No. 582,686

15 Claims. (Cl. 179—100.2)

This invention relates to an improved method and apparatus for initiating control operations in association with the reproduction of sound recordings. The principles of this invention are advantageously employed, for example, in recording devices having magnetic records in which control markers or tones are recorded in association with the sound track in order to actuate associated devices, such as a magnetic drum or tape recycling mechanism, in a desired program.

Recording devices employing magnetic record mediums and having various forms of control markers associated with the sound track to produce an auxiliary control function at a desired time relative the reproduction of the recorded message are well known in the art. In certain of these devices, the control markers take the form of a punched hole or other perforation strategically located on the tape so as to actuate a control device when the hole is detected by a sensing head. Other recording devices employ a control marker fabricated from an electroconductive material which is adhered to the record so as to establish an electrical circuit for operating a control device at the required time.

Perhaps the most successful form of control marker is a tone pulse which has been magnetically recorded upon the record. Prior art systems employing this type of marker use a single head for recording both the sound and control marker signals. In the usual instance, the recording head, or a different single head, is also employed to reproduce both the sound and the control marker signals on playback of the record. It can be readily appreciated that the design of the necessary amplifiers employing a single head as an input source is made relatively difficult and expensive inasmuch as the tone signal must be isolated from the sound signal at the system output. In many instances, the sound signals simulate the tone or otherwise erroneously actuate the auxiliary control device because of the fact that a single head reproduces both the sound and tone signals.

Additionally, in sound systems requiring high quality sound reproduction, the sound amplifier circuit must be designed so as to reject the tone pulse, otherwise the reproduction of the tone pulse introduces distortion in the sound output.

The foregoing stringent design requirements are attained in part in the prior art by recording the tone pulse at a single frequency or frequencies above or below the frequency response range of the sound amplifier connected to the reproducing head. A separate amplifier narrowly tuned to the frequency of the recorded tone is connected to the output of the reproducing head, or to an intermediate stage of the sound amplifier, so as to exclude the tone from the sound output and at the same time separately amplify the tone to the level required for operating a relay or other device.

Notwithstanding the foregoing design, erroneous operation of the auxiliary control device in response to the sound signals occurs quite frequently. Additionally, the amplifier designs are relatively complex and in some instances the frequencies required for high quality sound output must be attenuated to provide for a satisfactory tone channel. Space consuming and troublesome oscillator circuits are also necessary for generating a tone pulse outside the frequency range of the sound amplifier.

A principal object of this invention is to provide improved apparatus for recording and reproducing a control marker tone in such a manner that the tone is completely excluded from the output of the sound system during a reproducing operation, and in which the device actuated in response to tone reproduction is not subject to false operation from the sound frequencies.

Another object of this invention is to provide in systems of the foregoing type apparatus for reliably recycling a magnetic record in response to the reproduction of a control marker tone at the termination of sound track.

Another object of this invention is to provide in systems of the foregoing type satisfactory and reliable operation in response to control marker tones generated at power distribution frequencies thereby obviating the need for tone generating oscillators and the like.

Another object is to provide an improved tone amplifier responding exclusively to the tone pulse signals.

In a preferred embodiment of this invention, the sound track is recorded on a magnetic record by means of a conventional record-reproducing head. The conventional erase head which is positioned in advance of the record-reproducing head is not only employed for its usual erase functions, but also as a recording and reproducing head for the control marker. The tone output of this erase head is employed for example, to actuate apparatus for recycling the record medium through its initial or starting point. The output of the sound amplifier is completely free of any distortion or other undesirable effects which would tend to be caused by the introduction of the control marker tone on the sound record for the reason that the record-reproducing head never reaches the recording locale of the control marker. In particular, inasmuch as the erase head is positioned in advance of the record head the moment the tone is recorded and/or reproduced by this head the recording device is recycled before the record-reproducing head senses the tone.

In view of the fact that the record head does not sense the control marker, it is possible to generate the control marker at a power line frequency of the order of 60 cycles and at a substantially higher level than the sound signals. This mode of operation makes possible the discrimination of sound and tone signals in the tone amplifier not only on the basis of frequency but also on the basis of signal level. Additionally, the sound amplifier design is relatively simplified because of the fact that the tone rejection capabilities need not be as great as heretofore required.

In order that all of the structural features for attaining the objects of this invention may be readily understood, reference is herein made to the accompanying drawings wherein:

Figure 1 is a vertical elevation view of a recording device employing a magnetic medium and in which recycling of the record is initiated in accordance with the principles of this invention;

Figure 2 is a partial end view taken along lines 2—2 of Figure 1 and showing the relative disposition of the record-reproducing head relative the erase head;

Figures 3 through 8 are a schematic electrical diagram of the circuitry associated with the machine shown in Figures 1 and 2 in order to effect recycling of the record in accordance with the principles of this invention;

Figure 9 is a diagram showing the proper physical placement of the drawing sheets containing Figures 3 through 8 to form a proper composite electrical circuit;

Figure 10 is a graph showing the frequency response of the tone amplifier and tone head;

Figure 11 is a graph showing the rectified signal output of the tone amplifier during a tone reproduction period;

Figure 12 is a graph showing the direct-current tone pulse which actuates the tone relay; and Figure 13 is a timing diagram of the closure times of the machine switches and the operate times of the principal circuit relays with reference to the machine functions.

Figure 4:
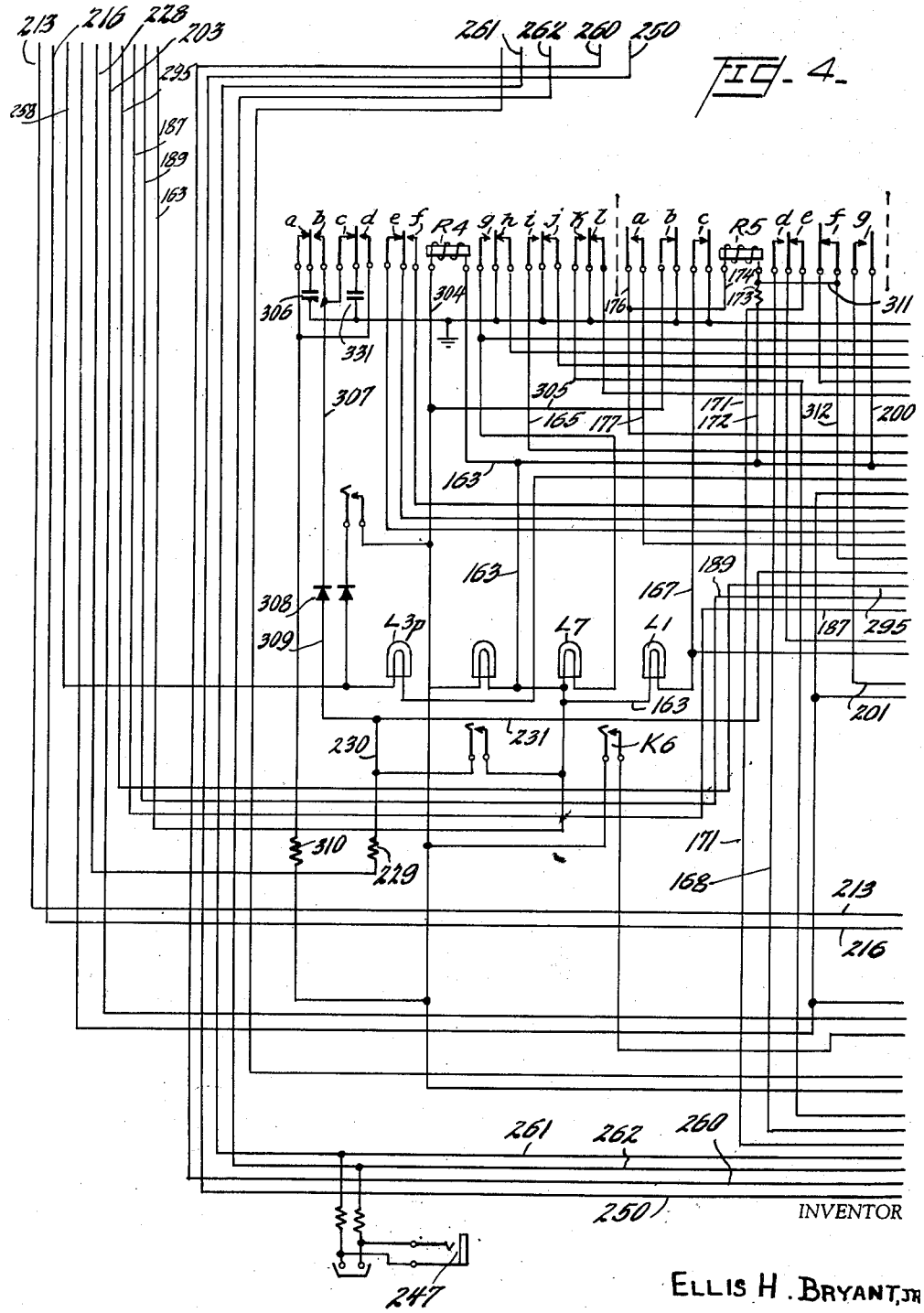

In order to facilitate an understanding of the invention, the detailed description herein makes reference to a recording machine which is the subject matter of the copending application of John O. McCarty, Serial No. 582,696, filed May 4, 1956, for Automatic Recording and Announcing Machine. This machine is particularly adapted for operation in accordance wtih the principles of this invention and the views of the machine shown in Figures 1 and 2 have been simplified so as to disclose only the necessary details.

Referring now to Figure 1, shaft 10 is rotatively mounted in anti-friction bearings 11 and 12 which are centrally supported with respect to end members 13 and 14, respectively, of a generally cylindrical casing 15, which is surmounted by a superstructure 16. The superstructure 16 consists of a generally rectangular housing secured to the casing 15 as by means of screws (not shown) and enclosed by a cover plate 18. The housing 16 supports the traveling carriage and its associated mechanism including erase head 78 and record-reproducing head 79 as hereinafter described.

Rotation is imparted to the right terminal end of shaft 10 by a motor and suitable reduction gearing (not shown). The left end 32 of shaft 10 which is reduced carries fly wheel 33 to which is secured the drum 34 on which the cylindrical record 35 is mounted. The record 35 is fabricated of resilient magnetic material, and the desired message is magnetically recorded thereon by head 79 shown in Figure 2. The right end 36 of the shaft 10 which is reduced rotatably carries magnet 37 and adjacent thereto a mercury switch is fixedly mounted on stationary bracket 40 secured to the end member 14. The switch 39 and magnet 37 are employed to carry out a synchronizing function as hereinafter described.

The movable carriage of the machine comprises a pair of transversely spaced, longitudinally extending rods only one of which, 51, is shown in Figure 1. The rods are slideably mounted in bearings (not shown) formed in the respective ends of the superstructure 16. Heads 78 and 79 are secured to a mounting bracket 75 which is fixedly coupled to the left ends of the rods.

A generally vertical guide member 52 is secured to longitudinal rod 51 through an extension terminating in a sleeve encircling the rod. The guide member 52 is centrally apertured to receive generally vertical rodlike element 59 for reciprocal movement within the guide member 52, the lower end of the rodlike element carrying a half-nut 60 which is threaded for engagement with a lead screw thread 61 formed on the shaft 10. A spring 62, mounted between the lower end of the guide member 52 and the upper surface of the half-nut 60, biases the latter toward its lowered position.

Raising and lowering of the element 59, and the lead screw follower or half-nut 60 carried thereby are brought about as follows: A shelf or longitudinally elongated lever 90 is pivoted to the wall of superstructure 16, and extends laterally so as to be coupled with a roller (not shown) carried by the element 59 throughout the various positions of half-nut 60 relative the threads on shaft 10. The elongated lever is actuated in a generally vertical direction by means of a link 89 the upper end of which is connected to and actuated by the armature of solenoid 95. The energization of solenoid 95 elevates the link 89, thereby correspondingly actuating the shelf lever 90, element 59, and removing the half-nut 60 from the threads on shaft 10.

When the follower half-nut 60 leaves the lead screw thread 61 on the shaft 10, the carriage driving connection is interrupted and the carriage comprising the longitudinal rods 51, generally vertical guide member 52, and associated mechanism including heads 78 and 79, is returned to the zero or starting record position by spring 73. This operation aligns heads 78 and 79 with the left edge of record 35.

The rod 51 carries, at its right end, an arm 70 projecting through a slot in plate 18 and on which is mounted a magnet 101 for activating the various mercury switches fixedly mounted by means of brackets on the upper surface of stationary plate 18. For the purposes of the invention herein, the function of the carriage return switch 99 mounted on bracket 100 is the only one that is material and its detailed mode of operation is described hereinafter.

The electrical circuitry connected to motor 20 (shown only in the electrical circuitry), solenoid 95, heads 78 and 79, and machine switches 39, and 99, to recycle the record 35 in response to a control marker tone recorded and reproduced in accordance with the principles of this invention is shown in Figures 3 through 8 when combined as indicated in the diagram of assistance of Figure 9.

Referring to the electrical circuitry, a recording operation can be initiated from either remote recording station 157 or local recording station 332 (Figure 3). Record key K2 located at the machine control panel (Figure 5) is manually operated to the left in the event that the output of the local recording pre-amplifier comprising tubes T19 and T20 is to energize recording head 79 (Figure 7). In the event that a recording is to be made from the remote recording station 157, record key K2 is maintained in the neutral position shown in the drawing and remote key K4 (Figure 3) is manually actuated.

The sound output of the particular recording station switched into operation is applied to the primary winding of input transformer 211. This input signal is amplified by the four-stage amplifier comprising tubes T10 through tubes T15 (Figure 8), and the amplifier output stage comprising tubes T14 and T15 energizes output transformer 180 (Figure 7). The secondary of output transformer 180 comprises a plurality of windings in which winding 267 energizes head 79 during the recording operation, and windings 248 and 249 develop the sound output which is transmitted to telephone line connector 317 (Figure 3) during playback operation, and windings 181 and 182 apply amplifier sound output to the voice alarm circuitry comprising tubes T6 and T7 (Figure 8). The voice alarm circuitry is actuated by any sound gaps in the message being recorded or reproduced and can be employed to actuate appropriate circuitry for operating a voice alarm and also recycling the carriage.

The necessary bias currents applied to head 79 (Figure 7) during the recording operation are generated by the bias oscillator comprising tube T9 (Figure 8) and associated components. This bias oscillator also supplies the erase currents for energizing erase head 78.

The output of head 79 is applied to input transformer 191 during playback operation. The signal developed in the secondary winding of this input transformer is applied to a pre-amplifier comprising tube T8 (Figure 8) and associated components. The pre-amplifier output is applied to the amplifier comprising tubes T10 through T15 with signal output being developed in output transformer 180.

A recycling tone pulse is applied to erase head 78 from one side of the heater source for bias oscillator tube T9 (Figure 8). This recycling tone is reproduced by the erase head 78 during a playback operation and is amplified by the tone pre-amplifier tube T1, tone amplifier tubes T2 and T3 and the tone rectifier and direct current amplifier comprising tubes T4 and T5 (Figure 7). The output of the tone amplifier appearing at the cathode of tube T5 is appropriately applied to solenoid 95 at the required times to effect recycling of the carriage.

Relays R1 through R12 and associated circuit connections in the main, provide the necessary sequence of the circuit operations required for machine operation.

The detailed operation of the mechanical structure of the transcription machine shown in Figures 1 and 2, in cooperation with the electrical circuitry shown in Figures 3 through 8 is as follows:

At the outset it is assumed that all circuits are in the de-energized condition and that erase head 78 and record-playback head 79 have a random positioning relative record 35. With the apparatus in this condition, a normal operational program is first described comprising (1) placing the system in readiness for making a sound recording, (2) making a recording, (3) generating a recycling tone, (4) recycling the carriage and placing the system in readiness for a playback operation, (5) playback of the previously recorded message, and (6) recycling the carriage in response to the previously recorded recycling tone. The foregoing sequence of operations with reference to the closure times of the machine switches and the operate times of the principal circuit relays is graphically shown in the timing diagram of Figure 13. The understanding of the detailed circuit description will be considerably facilitated by reference to this figure.

*(1) Placing the system in readiness for making a sound recording*

Initially master switch 150 is closed, thereby applying alternating line potential from terminals 151 to the primary winding of power transformer 152. The energization of transformer 152 results in the heating of the filament of full-wave rectifier tube T16 and the application of an alternating high voltage to the anodes of tube T16. The full-wave pulsating direct-current appearing between the filament of tube T16 and ground is filtered and divided by the associated resistor, capacitor and inductor components. In a preferred embodiment, relatively smooth direct-current potentials of the order of 300 volts, 320 volts, 340 volts, and 380 volts are applied to terminals 153, 154, 155, and 156 respectively. The potentials appearing between these terminals and ground energize tubes T1 through T15 in the appropriate manner as hereinafter outlined.

The closure of master power switch 150 also drives motor 20 by a circuit including conductor 158, motor circuit breaker 159, conductor 160, motor 20 and conductor 161. The resulting energization of motor 20, rotates shaft 10 as hereinbefore outlined thereby rotating drum 34 and driving the carriage and heads 78 and 79 relative the drum.

Alarm relay R5, which establishes certain supervisory alarm conditions hereinafter set forth in detail, is de-energized inasmuch as the left terminal of the winding is not returned to ground when the retire alarm key K1 is in the neutral position shown in the drawing. This condition of relay R5 energizes alarm lamp L1 by current flow from 48 volt battery 162 through conductor 163, alarm lamp L1, conductor 167, and contact R5c back to ground. The energization of alarm lamp L1 renders a visual indication at the control panel for the machine that the apparatus is not in readiness for proper recording or playback. Additionally, the closure of contact R5e applies ground to alarm conductor 171 by a circuit connection from ground to conductor 169, contact K1d of the retire alarm key, conductor 170, and contact R5e back to alarm conductor 171. The application of ground to conductor 171 energizes an alarm device which may be remotely located at a suitable operating panel in a telephone central office or the like. The opening of contact R5e at this time removes ground from alarm conductor 168.

The retire alarm key K1 is manually actuated to the left in order to remove the aforementioned alarm conditions. With this operation, alarm relay R5 is energized by a current flow from battery conductor 163 through conductor 172, resistor 173, the winding of relay R5, conductor 174, conductor 175, and contact K1a, to ground. The energization of alarm relay R5 opens contacts R5c and R5e and closes contact R5d thereby de-energizing alarm lamp L1 and any alarm device connected to alarm conductors 168 and 171 at the telephone central office.

Retire alarm key K1 is manually returned to the neutral position shown in the drawing after only momentary operation, inasmuch as a hold circuit for relay R5 is established by a circuit including conductor 174, conductor 176, contact R5a, conductor 177, conductor 178, conductor 179, and contact R10b back to ground. Contact R10b is in the closed position at this time, inasmuch as voice alarm relay R10 is immediately operated whenever sound output appears at amplifier output transformer 180. In particular, the sound output voltages appearing across serially-connected secondary windings 181 and 182 are applied to the control grid and anode of voice-alarm input tube T6 through conductor 183. The alternating sound currents are rectified by tube T6 and a direct-current potential is developed across resistor 184 and capacitor 185. The resulting potential is applied to the control grid of voice alarm output tube T7 through grid resistor 186. This operation reduces the bias appearing across the control grid-cathode space path of tube T7 to a substantially zero value, whereby considerable cathode current is caused to flow through conductor 187 which is connected to the cathode of tube T7. Conductor 187 is returned to ground by a circuit which includes the winding of relay R10, conductor 188, conductor 189 to the adjustable tap of cathode-bias resistor 190 for push-pull power amplifier tubes T14 and T15.

The sound output appearing across output windings 181 and 182 and applied to voice-alarm input tube T6 is developed at this time inasmuch as record-playback head 79 is connected to the primary winding of playback-amplifier input transformer 191 by a circuit which includes conductor 272 connected to head 79, contact R3c, conductor 193, the primary winding of transformer 191, conductor 194, contact R3a, and conductor 273 back to head 79. The sound input at transformer 191 resulting from the playback of a prior recording is amplified by pre-amplifier tube T8, amplifier tubes T10 through T15 thereby developing a high level output at output transformer 180.

The energization of voice alarm relay R10 establishes a hold circuit for alarm relay R5 by applying ground to the left terminal of the alarm relay winding through conductor 174, conductor 176, contact R5a, conductor 177, conductor 178, and contact R10b back to ground. Thereafter retire alarm key K1 is returned to the neutral position. The opening of contact R10a removes ground from conductor 196 which is connected to voice-alarm lamp L2. This operation de-energizes lamp L2 which in the energized condition is indicative of a defective recording or the failure of sound output at transformer 180 as will hereinafter be outlined in detail. Additionally, the energization of voice alarm relay R10 opens contact R10d, thereby removing ground from voice alarm conductor 199, which is normally grounded through a circuit including retire alarm contact K1e, conductor 198, and contact R10d back to voice alarm conductor 199. The application of ground to voice alarm conductor 199 is employed to energize a voice alarm which may be remotely located at a telephone central office or the like. The opening of contact R10c removes ground from voice alarm conductor 197.

With relays R5 and R10 in an energized condition, all local and remotely located alarm devices are de-energized indicating that the system is in readiness for a recording operation.

Record key K4 may thereafter be manually operated in order to initiate the recording operation. The closure of this key applies an energizing potential from a battery conductor 163, to energize relay R1 in a circuit including conductor 200, contact R5g, conductor 201, contact K2b, contact K2k, conductor 165, record key K4, conductor 202, conductor 203, conductor 204, the winding of relay R1 back to ground through conductor 205. The operation of relay R1 energizes the parallel connected windings for relays R2 and R3 by applying the battery potential appearing on conductor 163 to the left terminal of relay R2 in a circuit which includes conductor 206, contact R1f, and conductor 207 to conductor 208, and to the left terminal of relay R3 from conductor 207 to conductor 209. The right terminals for the windings of both relays are grounded. The closure of contacts R2f and R2h applies the output from remotely located recording microphone 210 to the primary winding of recording input transformer 211. In particular, the microphone signal is amplified by the pre-amplifier comprising tubes T17 and T18, and the secondary of the pre-amplifier output transformer is included in a circuit comprising conductor 212, contact K2f, conductor 213, contact R2f, conductor 214, primary winding of transformer 211, conductor 215, contact R2h, conductor 216, contact K2h, conductor 217, back to the secondary winding of the pre-amplifier output transformer.

The secondary potential developed in input transformer 211 is applied to the control grid of amplifier tube T10 through a circuit including conductor 218, recording level potentiometer 219, grid resistor 220, conductor 221 and conductor 222. Any signal applied to the control grid of amplifier tube T10 is amplified by the conventional four-stage amplifier comprising tubes T10 through T15. The push-pull output developed across the output stage comprising tubes T14 and T15 is applied to the primary winding of the amplifier output transformer by conductors 223 and 224. Plate potential is applied to the anodes of tubes T14 and T15 from power supply output terminal 156 by conductor 225 and the split primary winding of output transformer 180.

Actual recording is delayed for a period of approximately two seconds after the closure of relays R2 and R3 and until such time as record lamp L3 is energized by circuits hereinafter described, thereby rendering a visual signal that the system is in readiness for recording.

The closure of contact R1d discharges capacitor 226 through the winding of relay R7 in a circuit connection which includes contact R1d, conductor 227, conductor 228, resistor 229, conductor 230, conductor 231 and conductor 232 through the left winding of relay R7 back to ground. Relay R7 is operated for a relatively short period of the order of one-half second and until such time as capacitor 226 discharges below the hold value for relay R7. Capacitor 226 normally stands in a charged condition by the application of the battery potential appearing on conductor 163 through conductor 233 and contact R1e.

The momentary operation of relay R7 energizes recycle relay R8 by applying ground to the left terminal of the recycle relay through conductor 234, contact R7b and conductor 235. The closure of contact R8b energizes rotary solenoid 95 by applying the battery potential appearing on conductor 163 to the winding of solenoid 95 in a circuit including conductor 236, contact R8b, conductor 237, and the winding of solenoid 95 back to ground.

The energization of solenoid 95 raises elongated lever 90, thereby lifting element 59 and nut 60 (Figure 1). When follower half-nut 60 leaves the lead screw thread 61 of the shaft 10, the carriage driving connection is interrupted and the carriage, driven longitudinal rods (rod 51 only one shown), guide member 52, and associated mechanism including heads 78 and 79, are recycled or returned to the zero or starting position by spring 73.

Record lamp L3 is de-energized in response to the operation of recycle relay R8 thereby rendering a visual indication that the recording should not commence at this time. It should be noted from the timing diagram shown in Figure 13 that the recycle relay R8 is operated approximately one-half second after record key K4 is first actuated. During this one-half second interval the record lamp L3 is momentarily energized by the same circuit connection which establishes energization of record lamp L3 during the period which actual recording can be undertaken. This circuit connection includes contact R8b and will be described in detail hereinafter in association with the operation which occurs when recycle relay R8 is subsequently de-energized.

It will be recalled that the energization of recycle relay R8 was established through contact R7b. Inasmuch as relay R7 is energized for an interval of the order of a fraction of a second, a hold circuit for relay R8 is established through contact R8a, conductor 238 and contact R6c back to ground.

Sound relay R9 is energized at the same time that recycle relay R8 is operated in response to the momentary operation of relay R7. In particular, the battery potential appearing on conductor 163 is applied to the right terminal of the winding of relay R8 through a circuit including conductor 239, contact R7f, conductor 240, conductor 241 and conductor 299. The closure of contacts R9b and R9d short circuits sound output terminals 242 and 243 of the transmission machine. Line connector circuit 317 is shown connected to terminals 242 and 243 whereby the recorded message can be transmitted over the telephone distribution system during playback. This short circuit is established by a circuit connection including conductor 244 connected to terminal 242, contact R9b, conductor 245, contact R9d, conductor 246 and conductor 259 back to terminal 243.

The return of the carriage to its leftmost position in response to the energization of solenoid 95, results in the closure of carriage return switch 99, inasmuch as magnet 101 carried by arm 70 is driven to a position adjacent switch 99 in response to the recycling of the carriage.

The actuation of carriage return switch 99 at this time is ineffective to promote any circuit operation inasmuch as this switch is connected in series with synchronization switch 39 mounted on bracket 40. As soon as shaft 10 is advanced the necessary fraction of a single revolution required to actuate synchronization switch 39 in response to the close positioning of magnet 37, as is shown in Figure 8, relay R6 is energized inasmuch as the left terminal of the winding of this relay is grounded by a circuit including conductor 251, carriage return switch 99, conductor 252, and synchronization switch 39 back to ground through conductor 253. The battery potential appearing on conductor 163 is applied to the right terminal of the winding of the relay R6 through conductor 254.

Relay R6 is energized for only a fraction of a second inasmuch as the synchronization switch 39 is released as soon as magnet 37 advances a very short angular distance beyond the operative position shown in Figure 8. Additionally, carriage return switch 99 is so associated with movable magnet 101 that this switch is closed for less than one revolution of drum 34, whereby the serial connection established by the concurrent closing of synchronization switch 39 and carriage return switch 99 occurs only for a very short angular distance of a single predetermined revolution of drum 34.

The foregoing mode of switch operation synchronizes the starting point of message recording with the starting point of message playback by insuring at all times, synchronization of the sound carriage with the driving means for drum 34. In particular, timed release of contact R6c opens the recycle hold circuit established therethrough for recycle relay R8, thereby de-energizing this relay and releasing contact R8b. The release of contact R8b opens the energizing circuit for solenoid 95 previously established therethrough. The de-energization of solenoid 95 enables motor drive to again be applied to the carriage.

(2) Making a recording

Remote record lamp L3 and panel record lamp L3p are energized in response to the timed release of relay R8 by current flow from battery conductor 163 through conductor 200, contact R5g, conductor 201, contact K2b, contact K2k, conductor 165, remote record lamp L3, conductor 255, conductor 256, contact R8d, conductor 257, panel record lamp L3p, conductor 258 and contact R3e back to ground. The energization of the record lamps gives a visual signal that the recording operation can now be commenced by talking into microphone 210.

Sound relay R9 is a slow release relay and therefore the contacts actuated thereby are held up for approximately half a second beyond the de-energization of recycle relay R8. The release of sound relay contacts R9b and R9d is required in order to remove the short heretofore existing across in the output terminals 242 and 243, thereby applying the amplifier output from secondary windings 248 and 249 of transformer 180 to system output terminals 242 and 243 where the recording process may be monitored. This operation is effected by a circuit including conductor 250 which is connected to the output of transformer 180, contact R9e, conductor 246, and conductor 259 to terminal 243, and conductor 260 which is also connected to the output of transformer 180, contact R9c, and conductor 244, to terminal 242.

Output terminals 242 and 243 are shunted by a monitor jack 247 which is connected to conductors 244 and 259 by means of conductors 261 and 262. Conductors 261 and 262 also provide a relatively high impedance load across output terminals 242 and 243 during recording by a circuit which includes terminal 242, conductor 244, conductor 261, load resistor 263, conductor 264, contact R2a, through ground back to contact R2j, conductor 265, load resistor 266, conductor 262, and conductor 259 back to terminal 243.

The amplified sound appearing across secondary winding 267 of output transformer 180 is applied to recording head 79 by a circuit including conductor 268, resistor 269, conductor 270, conductor 271, contact R3d, conductor 272, through record head 79, conductor 273, contact R3b, conductor 274 back to ground.

The necessary recording bias is applied to record head 79 from the bias oscillator comprising tube T9 and associated components connected in a modified Hartley configuration through a circuit including conductor 275 connected to the anode of tube T9, capacitor 276, resistor 277, conductor 278, conductor 271, contact R3d, conductor 272, through record head 79, conductor 273, contact R3b and conductor 274 back to ground.

Erase head 78 is energized by erase current applied from the bias oscillator comprising tube T9 through the circuit including conductor 275, conductor 279, contact R1c, capacitor 280, conductor 281, and erase head 78 to ground.

The cathode for bias oscillator tube T9 is grounded by a circuit including conductor 281 and contact R3j to ground.

The closure of contact R3h grounds the output of the playback pre-amplifier tube T8.

(3) Generating a recycling tone

When the desired message has been recorded on record 35, record key K4 is released thereby de-energizing relay R1. The opening of contact R1f is ineffective, however, to promote the immediate release of the contact loads of relays R2 and R3. In particular, capacitor 283 which shunts the winding of relay R2 is charged during the recording period inasmuch as relay R2 is continuously energized, and the discharge circuit path for capacitor 283 through the windings of relays R2 and R3 has a sufficiently long time constant to maintain these relays energized for approximately one-half second longer than relay R1. The resulting change in the contact loads for relays R1, R2 and R3 completes the necessary circuits for applying a 60-cycle recycling tone from one side of the heater connection for bias oscillator tube T9 to erase head 78 through a circuit including conductor 284, tone control potentiometer 285, contact R2c, conductor 286, contact R1b, and conductor 281 through the erase head 78 to ground. The opening of contact R1b prevents the application of erase current to head 78 during the recording of the recycling tone.

(4) Recycling the carriage

Relays R2 and R3 are released as soon as capacitor 283 is discharged to a value below the hold value for these relays, thereby terminating the recording of the recycling tone. The release of relay R3 momentarily energizes relay R7 by discharging capacitor 287 in a circuit which includes contact R3g, conductor 288, rectifier 289, conductor 228, resistor 229, conductor 230, conductor 231, conductor 232, and the left winding of relay R7 back to ground. The momentary closure of the contact load for relay R7 energizes relays R8 and R9 as hereinbefore set forth.

The closure of contact R8b energizes solenoid 95 by current flow through the circuit hereinbefore set forth. The operation of solenoid 95 effects recycling as hereinbefore set forth, thereby returning the carriage to its leftmost position and heads 78 and 79 to the left edge of record 35.

(5) Playback of recording

The closure of carriage return switch 99 together with the closure of synchronization switch 39 energizes relay R6 as hereinbefore set forth thereby causing relays R8 and R9 to release their contact loads. The opening of contact R8b de-energizes solenoid 95 thereby enabling shaft 10 to again synchronously drive the machine carriage carrying heads 78 and 79 when the heads are adjacent the starting point of the record.

Record-playback head 79 is connected to the primary winding of playback-preamplifier input transformer 191 by a circuit connection including conductor 272 connected to head 79, contact R3c, conductor 193, the primary winding of transformer 191, conductor 194, contact R3a, and conductor 273 back to head 79. The input signal appearing across the control grid of pre-amplifier tube T8 is applied to the input of amplifier tube T9 through a circuit connection including playback level potentiometer 290 and associated resistors and capacitors and conductor 222. This signal is amplified by the stages comprising tubes T10 through T15, and the resulting output appearing across secondary windings 248 and 249 of output transformer 180 is applied to system output terminals 242 and 243 as hereinbefore set forth.

(6) Recycling the carriage in response to the recycling tone

The previously recorded recycling tone is played back shortly after the termination of the recorded message. This tone is applied to the control grid of tone preamplifier tube T1 from erase head 78 by a circuit including conductor 281 connected to erase head 78, contact R1b, conductor 286, contact R2b and conductor 291. The amplified tone is applied to the control grid of tone amplifier tube T2 the output of which is coupled to the control grid of tone amplifier tube T3. The signal voltage appearing in the plate circuit of tone amplifier tube T3 is applied to the multiply connected control grid and anode of tube T4. The rectified potential appearing across capacitor 292 and resistor 293 is applied to the control grid of tube T5 through limiting resistor 294. This action reduces the potential appearing across the control grid-cathode space path of tube T5 to substantially a zero level whereby an energizing current is provided for tone relay R11 through a circuit including conductor 295 connected to the cathode of tube T5, the winding of relay R11, conductor 296, conductor 189, to the center tap of bias resistor 190 for tubes T14 and T15.

Sound relay R9 is operated in response to the closure of contact R11b by current flow from battery conductor 163 in a circuit including conductor 297, contact R11b, conductor 298, conductor 299, and the winding of sound relay of R9 to ground. The resulting closure of contacts R9b and R9d shorts output terminals 242 and 243 as hereinbefore set forth thereby preventing the transmission of any spurious sounds during the recycling operation and prior to a succeeding playback period.

Relay R7 is energized in response to the operation of relays R9 and R11 by current flow from battery conductor 163 in a circuit which includes conductor 300, contact R11a, conductor 301, contact R9a, conductor 302, conductor 232, and the left winding of relay R7 back to ground. Recycle relay R8 is operated in response to the operation of relay R7 by current flow from battery conductor 163 in a circuit including conductor 303, the winding of recycle relay R8, conductor 235, contact R7b and conductor 234 to ground.

The contact loads of relays R7 and R11 are released in response to the completed playback of the recycling tone. The hold circuit established through contact R8a, conductor 239 and contact R6c back to ground maintains relay R8 in the energized condition notwithstanding the de-energization of relay R7.

Solenoid 95 is energized in response to the operation of recycle relay R8 by current flow from the battery conductor 163 and a circuit including conductor 236, contact R8b, conductor 237, the winding of solenoid 95 back to ground. This operation recycles the carriage and heads 78 and 79 of the recording machine as hereinbefore set forth. Solenoid 95 remains in the energized condition after recycling until such time as carriage return switch 99 and synchronization switch 39 are simultaneously closed whereby relay R6 is energized as hereinbefore set forth. Relays R8 and R9 are de-energized in response to the operation of relay R6 thereby de-energizing solenoid 95 and providing for the application of drive from shaft 10 to the machine carriage as hereinbefore set forth.

The apparatus is now in condition for a second or repeat playback operation which occurs in a manner identical to that described with respect to the playback operation hereinbefore set forth.

*Features of tone apparatus*

It should be noted that in the foregoing recycling operation, erase head 78 senses the recycling tone pulse to recycle the carriage. Inasmuch as this recycling operation occurs almost immediately, record 35 is prevented from rotatively advancing sufficiently to enable record-reproducing head 79 to sense the recycling tone. Accordingly, this novel mode of operation isolates the sound amplifier comprising tubes T9 through T15 from the recycling tone, thereby eliminating spurious noises from the sound output which might possibly result from the tone pulse. Additionally, the design of the sound amplifier is substantially simplified inasmuch as tone pulse rejection networks need not be incorporated. This enables the sound amplifier to reproduce the low-frequency sounds thereby improving the fidelity of sound reproduction.

The tone amplifier comprising tubes T1 through T3 and also erase head 78 are preferably selected and constructed so that they provide a peaked response to the tone frequency as is shown in Figure 10. Such a response is desirable for the reason that it substantially minimizes any tendency for the tone relay R11 to be erroneously actuated in response to the sound frequencies. Complete assurance against erroneous operation in response to the sound frequencies is attained by also incorporating within the tone amplifier components for providing an amplitude gate which is effective to prevent an output response due to the sound signals which are recorded at a relatively lower amplitude than the tone pulse as is shown in Figure 11.

The tone amplifier is selectively peaked to the tone frequency in part by the inclusion of capacitor 19 across the input of tone pre-amplifier tube T1. The component value of this capacitor is selected so as to form a filter in association with the inductive reactance of erase head 78 whereby all signals above 150 cycles per second are substantially attenuated. Capacitor 20 connected across the input of tone amplifier tube T2 and capacitor 21 connected across the input of tone amplifier tube T3 serve to attenuate further high-frequency signals present at the associated control grids. Low frequencies below 60 cycles are attenuated by the grid coupling condensers and the grid load impedance of tube T2 capacitor 20 and tube T3 capacitor 22 and the tone rectifier coupling condenser capacitor 24 and its load impedance. This is a simple high pass resistance capacity filter adjusted to cut off frequencies below approximately 30 cycles. Capacitor 23 connected between the anode of tube T3 and ground effectively shorts out any signal present at the tone amplifier output at the relatively high bias-oscillator frequency of the order of 30 kilocycles.

The bias network comprising resistor 24 and resistor 25 together with its shunting capacitor 26 provides a relatively fixed bias potential for tone amplifier tube T3 so a specific gating level is defined for tube T3 as is shown in Figure 11. This gating level is substantially above the maximum sound level of any of the sound frequencies present at the input of tube T3, and therefore the sound frequencies do not generate an output at the anode of tone amplifier tube T3. The foregoing gating feature is made possible inasmuch as the level at which the recycling tone is recorded is preferably set at or near the saturation point of the recording medium and therefore substantially above the amplitudes of the sound frequencies. This relative difference in the amplitude levels of the tone and sound signals is made possible in the disclosed apparatus inasmuch as the record-reproducing head 79 is prevented from sensing the tone pulse, and therefore the tone can be recorded at a relatively high level without the need for discriminating circuits in the sound amplifier.

The successive alternations comprising the tone pulse are rectified by the tube T4 with a direct-current pulse being developed across resistor 293 and capacitor 292. This pulse is amplified by the direct-current amplifier comprising tube T5 so that a pulse having a form shown in Figure 12 is applied to the tone relay R11 at the requisite times to initiate recycling of the carriage.

It should be understood that the above-described structure is merely illustrative of the principles of this invention and that alterations can be made therein without departing from the scope of the invention.

Having thus described the invention what is claimed as new and desired to be secured by Letters Patent is:

1. In recording and reproducing apparatus employing first and second sensing heads coupled to said apparatus and associated with a magnetic record and which heads are recycled relative the record in response to the reproduction of a control marker tone pulse to arrive at a record starting point, the improvement comprising an erase current source energizing said first head, a tone alternating-current source, means for initiating a recording operation by energizing said second head, means for terminating said recording operation and connecting said first head to said tone alternating-current source to the exclusion of said erase current source to momentarily record a tone pulse at the tone source frequency, means for resetting said record after said tone pulse is recorded, means for reproducing said recording, and means including said first head for recycling said record in response to the reproduction of said tone pulse and prior to the sensing of said pulse by said second head.

2. In recording and reproducing apparatus employing a record head and an erase head coupled to said apparatus and associated with a magnetic record and which heads are recycled relative the record in response to the reproduction of a control marker tone to arrive at a record starting point, the improvement comprising an erase current source energizing said erase head, a tone alternating-current source, means for initiating a recording operation by energizing said record head, means for terminating said recording operation and connecting said erase head to said tone alternating-current source to the exclusion of said erase current source to record a tone at the tone source frequency, and means for resetting said record after said tone is recorded.

3. In recording and reproducing apparatus employing a record-reproducing head and an erase head coupled to said apparatus and associated with a magnetic record and which heads are recycled relative the record in response to the reproduction of a control marker tone pulse to arrive at a record starting point, the improvement comprising an erase current source energizing said erase head, a source supplying an alternating-current potential at a power distribution frequency of 60 cycles per second, means including a record key for initiating a recording operation by energizing said record-reproducing head, means including said record key for terminating said recording operation and connecting said erase head to said alternating-current source to the exclusion of said erase current source to momentarily record a tone pulse at the power distribution frequency, means for resetting said record after said tone pulse is recorded, means for reproducing said recording, and means for recycling said record in response to the reproduction of said tone pulse by said erase head.

4. In recording and reproducing apparatus employing a record-reproducing head and an erase head coupled to said apparatus and associated with a magnetic record and which heads are recycled relative the record in response to the reproduction of a control marker tone pulse to arrive at a record starting point, the improvement comprising an erase current source energizing said erase head, a source supplying an alternating-current potential at a power distribution frequency, means including a record key for initiating a recording operation by energizing said record-reproducing head, means including said record key for terminating said recording operation and connecting said erase head to said alternating-current source to the exclusion of said erase current source to momentarily record a tone pulse at the power distribution frequency, means for resetting said record after said tone pulse is recorded and before said pulse is sensed by said record-reproducing head, means for reproducing said recording including said record-reproducing head, and means including said erase head for recycling said record prior to the sensing of said tone pulse by said record-reproducing head.

5. In recording and reproducing apparatus employing a record-reproducing head and an erase head coupled to said apparatus and associated with a magnetic record and which heads are recycled relative the record in response to the reproduction of a control marker tone pulse to arrive at a record starting point, the improvement comprising an erase current source energizing said erase head, a tone alternating-current source, means including a record key for initiating a recording operation by energizing said record-reproducing head, means including said record key for terminating said recording operation and connecting said erase head to said tone alternating-current source to the exclusion of said erase current source to momentarily record a tone pulse at the tone pulse frequency, means for resetting said record after said tone pulse is recorded and before said pulse is sensed by said record-reproducing head, means for reproducing said recording including said record-reproducing head, and means including said erase head for recycling said record prior to the sensing of said tone pulse by said record-reproducing head.

6. In recording and reproducing apparatus employing a record-reproducing head and an erase head associated with a magnetic record and which heads are recycled relative the record in response to the reproduction of a control marker tone pulse to arrive at a record starting point, the improvement comprising an erase current source energizing said erase head, a tone alternating-current source, means including a record key for initiating a recording operation by energizing said record-reproducing head, means including said record key for terminating said recording operation and connecting said erase head to said tone alternating-current source to the exclusion of said erase current source to momentarily record a tone pulse at the tone pulse frequency, means for resetting said record after said tone pulse is recorded, means for reproducing said recording, and means including said erase head for recycling said record in response to the reproduction of said tone pulse.

7. In record and reproducing apparatus employing a record head and an erase head coupled to said apparatus and associated with a magnetic record to record a tone pulse in a desired time relationship with the reproduction of a sound message to initiate a control operation, the improvement comprising an erase current source energizing said erase head, a tone alternating-current source, means for recording said message by energizing said record head, means for terminating said recording operation and connecting said erase head to said tone alternating-current source to the exclusion of said erase current source to momentarily record a tone pulse at the tone pulse frequency, means for resetting said record after said tone pulse is recorded, means for reproducing said recording, means including said erase head for sensing and reproducing said tone pulse, means for preventing said record head from sensing said tone pulse during reproduction, and means for initiating a control operation in response to the exclusive reproduction of said tone pulse by said erase head.

8. Recording and reproducing apparatus for recycling a recording carriage relative to a magnetic record through a record starting point comprising means for recording a sound message on the record, means for recording a tone pulse at the termination of said message near the saturation level of the magnetic recording medium, means for resetting the carriage after said tone pulse is recorded, means for reproducing the previously recorded message, means for reproducing the previously recorded tone pulse exclusively of any sound signal components by discriminating between the sound and tone signal amplitudes, and means for recycling the carriage in response to the exclusive reproducing of said tone pulse.

9. Recording and reproducing apparatus for producing a control operation in a desired time relationship with the reproduction of a sound message comprising means for recording said message on a magnetic record, means for recording a tone pulse at the termination of said message near the saturation level of the magnetic recording medium, means for resetting the record after said tone pulse is recorded, means for reproducing the previously recorded message, means for reproducing the previously recorded tone pulse exclusively of any sound signal components by discriminating between the sound and tone signal amplitudes, and means for initiating the control operation in response to the exclusive reproduction of said tone pulse after reproduction of said sound message.

10. Apparatus for producing a control operation in a desired time relationship with the reproduction of a sound message comprising means for recording said message on a magnetic record, means for recording a tone pulse at the termination of said message near the saturation level of the magnetic recording medium, means for resetting the record after said tone pulse is recorded, means for reproducing the previously recorded message, means for reproducing the previously recorded tone pulse exclusively of any message signal components by discriminating between the sound and tone signal amplitudes, and means for initiating the control operation in response to the exclusive reproduction of said tone pulse.

11. Apparatus for producing a control operation in a desired time relationship with the reproduction of a sound message comprising means for recording said message on a magnetic record, means for recording a tone pulse at a desired record point relative said message near the saturation level of the magnetic recording medium, means for reproducing the previously recorded tone pulse exclusively of any message signal components by discriminating between the sound and tone signal amplitudes, and means for initiating the control operation in response to the exclusive reproduction of said tone pulse.

12. Apparatus for producing a control operation in a desired time relationship with the reproduction of a sound message comprising means for recording said message on a magnetic record including a recording head, means for recording a tone pulse at a desired record point relative said message near the saturation level of the magnetic recording medium including a second recording head, means for reproducing the previously recorded message, means for sensing said tone pulse by said second record head only and reproducing the previously recorded tone pulse exclusively of any message signal components by discriminating between the sound and tone signal amplitudes, and means for initiating the control operation in response to the exclusive reproduction of said tone pulse.

13. Apparatus for producing a control operation in a desired time relationship with the reproduction of a sound message recorded by a magnetic recording device employing an erase head and a record head comprising means for recording said message on a magnetic record by said record head, means for recording a tone pulse at a desired record point relative said message near the saturation level of the magnetic recording medium by said erase head, means for reproducing the previously recorded message, means for sensing said tone pulse by said erase head and reproducing the previously recorded tone pulse exclusively of any message signal components by discriminating between the sound and tone signal amplitudes, and means for initiating the control operation in response to the exclusive reproduction of said tone pulse.

14. Apparatus for producing a control operation in a desired time relationship with the reproduction of a sound message recorded by a magnetic recording device employing an erase head and a record head comprising means for recording said message on a magnetic record by said record head, means for recording a tone pulse at a desired record point relative said message by said erase head, means for reproducing the previously recorded message, means for sensing said tone pulse by said erase head exclusively and reproducing the previously recorded tone pulse, and means for initiating the control operation in response to the exclusive reproduction of said tone pulse.

15. Apparatus for producing a control operation in a desired time relationship with the reproduction of a sound message recorded by a magnetic device employing a recording and an erasing head comprising means for recording said message on a magnetic record by one of said heads, means for recording a tone pulse at a desired record point relative said message by said erase head, means for reproducing the previously recorded message, means for sensing said tone pulse by said erasing head only and reproducing the previously recorded tone pulse exclusively of any message signal components, and means for initiating the control operation in response to the exclusive reproduction of said tone pulse.

References Cited in the file of this patent

UNITED STATES PATENTS

| | | |
|---|---|---|
| 882,329 | Lieb | Mar. 17, 1908 |
| 2,535,497 | Jones | Dec. 26, 1950 |
| 2,547,737 | Blaney | Apr. 3, 1951 |
| 2,724,015 | Van Deventer et al. | Nov. 15, 1955 |

OTHER REFERENCES

Begun: "Magnetic Recording," Murray Hill Books Inc., New York, 1949 (page 102 relied on).